(12) United States Patent
Voldsbekk

(10) Patent No.: US 9,684,088 B2
(45) Date of Patent: *Jun. 20, 2017

(54) RIGID-STEM ACTIVE METHOD AND SYSTEM

(71) Applicant: PGS Geophysical AS, Lysaker (NO)

(72) Inventor: Rune Sindre Voldsbekk, Drammen (NO)

(73) Assignee: PGS Geophysical AS, Oslo (NO)

( * ) Notice: Subject to any disclaimer, the term of this patent is extended or adjusted under 35 U.S.C. 154(b) by 741 days.

This patent is subject to a terminal disclaimer.

(21) Appl. No.: 13/729,260

(22) Filed: Dec. 28, 2012

(65) Prior Publication Data

US 2014/0185412 A1    Jul. 3, 2014

(51) Int. Cl.
*G01V 1/38* (2006.01)
*G01V 1/20* (2006.01)

(52) U.S. Cl.
CPC .......... *G01V 1/38* (2013.01); *G01V 1/201* (2013.01); *G01V 1/3843* (2013.01); *G01V 2001/204* (2013.01)

(58) Field of Classification Search
CPC ........ G01V 1/38; G01V 1/3843; G01V 1/201; G01V 2001/204
USPC .................................... 367/20, 154
See application file for complete search history.

(56) References Cited

U.S. PATENT DOCUMENTS

| | | | |
|---|---|---|---|
| 3,660,809 A * | 5/1972 | Pearson | G01V 1/201 367/152 |
| 4,781,140 A | 11/1988 | Bell et al. | |
| 4,809,243 A * | 2/1989 | Bledsoe | G01V 1/208 367/154 |
| 5,214,612 A * | 5/1993 | Olivier | G01V 1/201 114/245 |
| 5,521,885 A * | 5/1996 | Harvey | G01V 1/201 174/101.5 |
| 6,034,923 A | 3/2000 | Wooters | |
| 6,525,992 B1 * | 2/2003 | Olivier | G01V 1/201 114/245 |
| 6,775,204 B2 | 8/2004 | Scott | |
| 6,903,998 B2 | 6/2005 | Vaage | |
| 7,028,988 B2 | 4/2006 | Scott | |
| 7,142,481 B1 | 11/2006 | Metzbower et al. | |
| 7,167,412 B2 | 1/2007 | Tenghamn | |
| 7,221,619 B1 | 5/2007 | George | |

(Continued)

FOREIGN PATENT DOCUMENTS

| | | | |
|---|---|---|---|
| GB | 1299824 | 12/1972 | |
| GB | 1299824 A * | 12/1972 | G01V 1/201 |

(Continued)

OTHER PUBLICATIONS

UK Search Report mailed Mar. 20, 2014, in patent application No. GB1322509.9, 3 pages.

*Primary Examiner* — Ian J Lobo
(74) *Attorney, Agent, or Firm* — Glenn Strapp

(57) ABSTRACT

Disclosed are methods and systems for using a rigid-stem assembly comprising a plurality of interconnected rigid stems in a marine survey. An embodiment discloses a geophysical sensor streamer comprising a rigid-stem assembly comprising a plurality of rigid stems that are interconnected and each comprise a stem body defining one or more interior chambers, wherein a geophysical sensor is incorporated into one or more of the rigid stems.

30 Claims, 8 Drawing Sheets

(56) References Cited

U.S. PATENT DOCUMENTS

| | | |
|---|---|---|
| 7,260,024 B2 | 8/2007 | Goujon et al. |
| 7,298,672 B1 | 11/2007 | Tenghamn et al. |
| 7,352,654 B2 | 4/2008 | Goujon et al. |
| 7,426,439 B2 | 9/2008 | Ozdemir et al. |
| 7,641,421 B2 | 1/2010 | Roodenburg et al. |
| 7,737,698 B2 | 6/2010 | Tenghamn et al. |
| 7,778,114 B2 | 8/2010 | Goujon et al. |
| 7,800,976 B2 | 9/2010 | Stokkeland et al. |
| 7,834,632 B2 | 11/2010 | Tenghamn et al. |
| 7,974,152 B2 | 7/2011 | Tenghamn |
| 8,021,080 B2 | 9/2011 | Frivik et al. |
| 8,102,731 B2 | 1/2012 | Cambois |
| 8,267,031 B2 | 9/2012 | Austad |
| 2003/0117025 A1 | 6/2003 | Rouquette |
| 2003/0159877 A1* | 8/2003 | Martin ............... G01V 1/38 181/110 |
| 2007/0223306 A1* | 9/2007 | Toennessen ......... G01V 1/3808 367/15 |
| 2007/0266804 A1 | 11/2007 | Goujon et al. |
| 2008/0008034 A1* | 1/2008 | Tenghamn ........... G01V 1/201 367/20 |
| 2008/0267009 A1 | 10/2008 | Frivik et al. |
| 2009/0092006 A1 | 4/2009 | Teigen et al. |
| 2009/0161487 A1 | 6/2009 | Kjellgren et al. |
| 2009/0238035 A1* | 9/2009 | Hillesund ............. B63B 21/66 367/17 |
| 2010/0165792 A1* | 7/2010 | Stenzel ................ G01V 1/201 367/20 |
| 2010/0322565 A1 | 12/2010 | George et al. |
| 2011/0158043 A1* | 6/2011 | Johnstad ............. G01V 1/201 367/16 |
| 2011/0248718 A1* | 10/2011 | Sudow ................. G01V 1/201 324/365 |
| 2012/0081994 A1 | 4/2012 | Huson et al. |
| 2013/0100767 A1* | 4/2013 | Tustin ................. G01V 1/186 367/24 |
| 2014/0185409 A1 | 7/2014 | Voldsbekk |
| 2014/0185410 A1 | 7/2014 | Voldsbekk |
| 2014/0185411 A1 | 7/2014 | Voldsbekk |
| 2014/0254310 A1 | 9/2014 | Voldsbekk |

FOREIGN PATENT DOCUMENTS

| | | |
|---|---|---|
| WO | WO02/29948 A1 | 4/2002 |
| WO | WO2004/036252 A1 | 4/2004 |
| WO | WO2004/079398 A1 | 9/2004 |
| WO | 2013109672 A1 | 7/2013 |

\* cited by examiner

RIGID-STEM ACTIVE METHOD AND SYSTEM

BACKGROUND

The present invention relates generally to the field of marine surveying. More particularly, in one or more embodiments, this invention relates to methods and systems for performing marine geophysical surveys that utilize a rigid-stem assembly comprising a plurality of interconnected rigid stems in a marine survey.

Techniques for marine surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more geophysical sensor streamers also may be towed in the water at selected depths by the same or a different vessel. The streamers are typically cables that include a plurality of sensors disposed thereon at spaced apart locations along the length of the cable. The sensors may be configured to generate a signal that is related to a parameter being measured by the sensor. At selected times, the energy source may be actuated to generate, for example, seismic or electromagnetic ("EM") energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

In geophysical surveying, the streamer is typically a cable that is stored on a drum on the towing vessel. The streamers are typically made of multiple components, such as electrical conductors, fiber optics, and stress-supporting members, all bundled together and covered with a protective outer skin. The streamer may be up to several kilometers in length. In general, the streamer has little stiffness in directions other than inline, so it can move easily both laterally and in torsion/rotation when deployed in the water. When sensors such as velocity, position, and acceleration sensors are incorporated into the streamer, the movements are picked up directly. Unlike hydrophones which only pick up the movements indirectly because of improvements over the years, these other sensors may have a high level of noise which is not interesting for the marine survey. For example, the noise may be measurements of local conditions in the surrounding water rather than reflections from the Earth below.

Under a load of pressure on only a small portion of the outside, a streamer will bend, held back only by the tension, bending and torsional stiffness of the streamer, and the mass of the cable content, depending on the direction, distribution, and size of the pressure. Low bending and torsional stiffness for the streamer should result in little added mass, but cause large local movement. As result, the streamer may have large local sensor recordings (i.e., measurements of local conditions in the surrounding water) and also large waves of motion traveling through the cable. Low stiffness may also result in large sagging of the cable between steering devices with wings commonly used to control lateral or vertical position of the streamer. Because of the large sagging, there may be large angles between the cable and fluid flow, further increasing turbulence and noise generation from hydrodynamic flow.

Accordingly, there is a need for improved methods and systems for deploying streamers in geophysical surveys having increased stiffness both laterally and in torsion to reduce noise sources in marine geophysical surveys.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine surveying. More particularly, in one or more embodiments, this invention relates to methods and systems for performing marine surveys that utilize a rigid-stem assembly comprising a plurality of interconnected rigid stems in a marine survey. One or more rigid-stem assemblies in accordance with embodiments of the present invention may be used to form at least part of a geophysical sensor streamer that are conventionally in the form of flexible cables. The rigid stems may be assembled on a survey vessel to form one or more long rigid-stem assemblies that can be deployed in the water. Streamer components, such as electrical or optical conductors, geophysical sensors, and other electronics may be arranged in the rigid stems. The rigid stems can have a round cross-section or have other shapes, such as wing-shaped cross-section for low drag or un-symmetric cross-section for optimization of properties or response.

Figure 1:
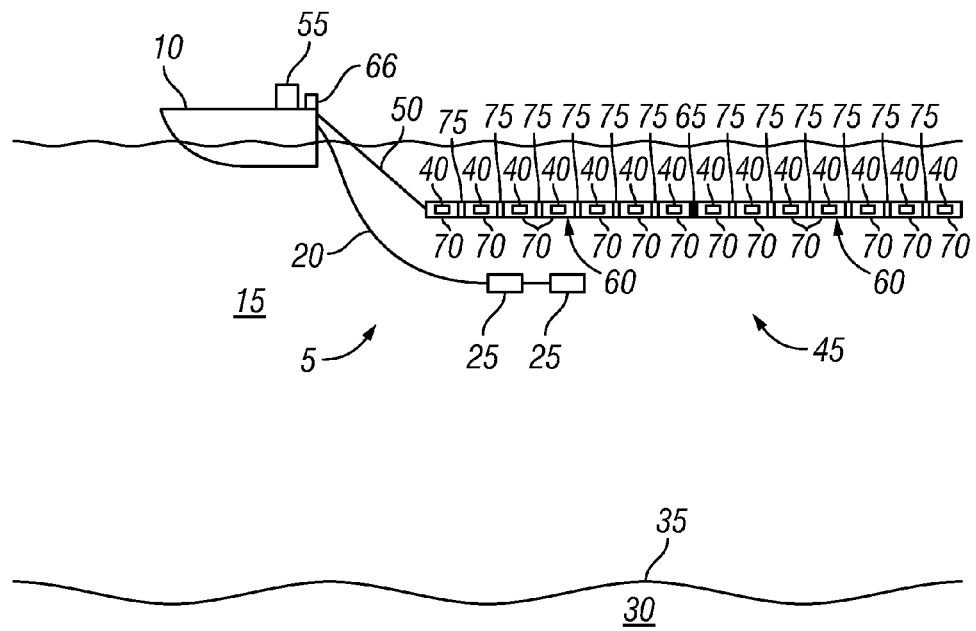
FIG. 1 illustrates an example embodiment of a marine geophysical survey system that comprises a sensor streamer formed from a two rigid-stem assemblies coupled end-to-end.

FIG. 1 illustrates a marine survey system 5 in accordance with embodiments of the present invention. In the illustrated embodiment, the system 5 may include a survey vessel 10 that moves along the surface of a body of water 15, such as a lake or ocean. The survey vessel 10 or a different vessel (not shown) can tow a source cable 20 that includes one or more energy sources 25. As illustrated, the energy sources 25 may be towed above the water bottom 35, wherein the energy sources 25 are disconnected from the water bottom 35. In some embodiments (not shown), one or more of the energy sources 25 may be mounted to the hull of the survey vessel 10. The energy sources 25 may be any selectively actuable sources suitable for subsurface surveying, including without limitation seismic air guns, water guns, vibrators, EM transmitters, or arrays of such devices. As energy is emitted by the energy sources 25, a signal propagates downwardly through the body of water 15 and rock formations 30 below the water bottom 35. A modified signal that is reflect by the rock formations 30 may be detected by sensors 40 disposed along a streamer 45 towed by the survey vessel 10 or another vessel. A lead-in 50 may couple the streamer 45 to the survey vessel 10. In the illustrated embodiment, the lead-in 50 may comprise a cable. The sensors 40 may be disposed on the streamer 45 at spaced apart locations. The type of the sensors 40 is not a limit on the scope of the present invention and may be hydrophones or other pressure responsive sensors, geophones, accelerometers or other motion respective sensors, EM receivers, or combinations thereof.

Signals generated by the sensors 40 may be communicated to equipment on the survey vessel 10, shown generally at 55 and referred to for convenience as a "recording system." The recording system 55 typically includes devices (none shown separately) for navigating the survey vessel 10, for actuating the energy sources 25, for example, electrical controller with swept frequency alternating current or other signal, and for recording signals generated by the sensors 40.

The streamer 45 may be formed, for example, by coupling a plurality of rigid-stem streamer assemblies 60 end-to-end. As illustrated, two rigid-stem streamer assemblies 60 may be coupled end-to-end, for example, at connection point 65. It is contemplated that more than two rigid-stem streamer assemblies 60 may be used in embodiments of the present invention. Each of the rigid-stem streamer assemblies 60 may comprise a plurality of interconnected rigid stems 70. Stem joints 75 may be secured at the intersection of adjacent rigid stems 70 for closing the flexible connection between the adjacent rigid stems 70. While not illustrated, a stem joint 75 may not be used, in some embodiments, to couple at least one pair of adjacent rigid stems 70 leaving an open joint. As previously mentioned, the streamer components (e.g., conductors, sensors 40, and other electronics) may be disposed in the rigid stems 70. For example, geophysical sensors, such as motion sensors, may be disposed inside the rigid stems 70 with the sensing water motion relative to the streamer assemblies 60 being the motion senses by the rigid stems 70. By way of further example, channels or other membranes (not shown) may be provided in the rigid streamer stems 70 for seismic sensors, such as hydrophones, for containing the pressure signal from the body of water 15.

In the illustrated embodiment, the sensors 40 are incorporated into the rigid stems 70. While the present example, shows only one streamer 45, the invention is applicable to any number of laterally spaced apart streamers towed by survey vessel 10 or any other vessel. For example, in some embodiments, 8 or more laterally spaced apart streamers may be towed by the survey vessel 10, while in other embodiments, up to 26 or more laterally spaced apart streamers may be towed by survey vessel 10. Advantageously, when towing multiple streamers (such as streamer 45 on FIG. 1) that contain the rigid-stem streamer assemblies 60, the streamers may be held at independent positions, both laterally and vertically (relative to tow path). For example, one of the streamers may be held at or near the surface while the other streamers may be positioned deeper in the body of water 15. In some embodiments, the streamer 45 may be towed at a depth of up to about 25 meters. In alternative embodiments, the streamer 45 may be towed at a deeper depth than is typically employed in seismic surveys. For example, the streamer 45 may be towed at a depth of up to about 50 meters or more.

The streamer 45 comprising the rigid-stem streamer assemblies 60 may be deployed from the survey vessel 10 using any suitable technique. For example, a rigid-stem streamer assembly 60 may be assembled and deployed from the survey vessel 10. The rigid-steam streamer assembly 60 may be formed by closing a flexible connection between adjacent rigid stems 70 as will be discussed in more detail below. A linear-tensioning machine 66 disposed on the survey vessel 10 may deploy the rigid-stem streamer assembly 60 into the body of water 15. Additional flexible connections between rigid stems 70 may be closed as the linear-tensioning machine 66 deploys the rigid-stem streamer assembly 60 into the body of water 15. In some embodiments, the liner-tensioning machine 66 may comprise one or more wheel pairs that hold the rigid-stem streamer assembly 60 in tension as it is deployed. Other suitable linear-tensioning machines may be used that are capable of holding the rigid-stem streamer assembly 60, including clamps that engage shoulders on the rigid stems 70 or grooves or chamfers on the rigid stems 70; clamps in belts or in pistons or other linear machines that apply force to the rigid stems 70; a hook or other attachment device on a rope coupled to an attachment on the rigid stems 70, or pins that enter holes on the rigid stems 70 and which may be spring driven. The liner-tensioning machine 66 may also be used for retrieval of the rigid-stem streamer assembly 60.

Figure 2:
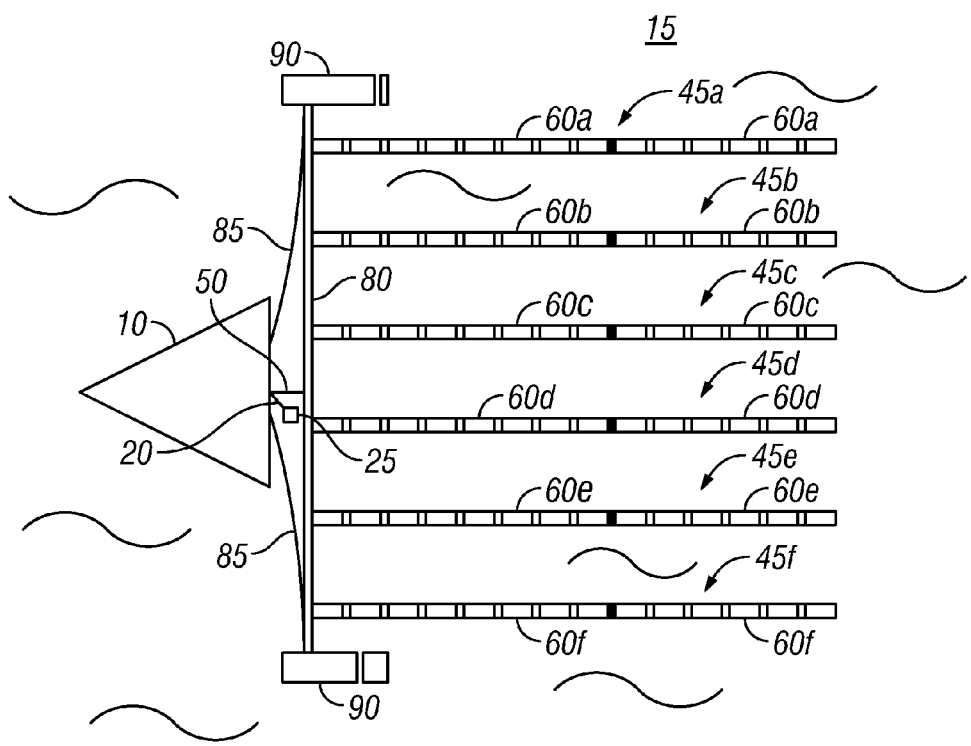
FIG. 2 illustrates another example embodiment of a marine geophysical survey system that comprises a plurality of laterally spaced apart sensor streamer that each comprise rigid-stem assemblies.

FIG. 2 illustrates an example embodiment in which the survey vessel 10 tows a plurality of laterally spaced apart streamers 45a-45f. "Lateral" or "laterally," in the present context, means transverse to the direction of the motion of the survey vessel 10. As illustrated, the streamers 45a-45f each comprise one or more rigid-stem streamer assemblies 60a-60f. In the illustrated embodiment, two rigid-steam streamer assemblies 60a-60f connected end-to-end are shown for each of the streamers 45a-45f. The sensor streamers 45a-45f may be coupled to the survey vessel 10 by a lead-in line 50 wherein one or more spreader lines 80 may extend between the sensor streamers 45a-45f. Deflectors 90 or other suitable spreading devices may be used that provides lateral thrust with respect to the direction of movement of the survey vessel 10 for maintaining a desired lateral spacing of the sensor streamers 45a-45f. The deflectors 90 may be any type of deflector known in the art that generates lateral thrust as towed through the body of water 15, such as wing-shaped bodies and deflectors having one or more foils. In the illustrated embodiment, a pair of deflectors 90 is employed with one of the deflectors 90 positioned at either end of the spreader lines 80. In the illustrated embodiment, each of the deflectors has a separate tension member 85 (e.g., a fiber rope, armored cable, etc.) coupling the corresponding one of the deflectors 90 to the survey vessel 10 for transmitting towing force and/or transmitting power and/or signals. Remotely operated vehicles or other powered water craft may be utilized in conjunction or as an alternative to the deflectors 90 that provide lateral thrust.

It should be understood that embodiments of the present technique may be applicable to seismic surveying and other types of marine surveying in which a sensor or other collecting device may be used to collect data while it is towed through the body of water 15. For example, a rigid-stem streamer assembly (e.g., rigid-stem streamer assemblies 60 on FIGS. 1 and 2) comprising a plurality of interconnected rigid stems may be used in other types of marine surveying such as when towing sensors, such as acoustic, motion, EM, sonar, or other suitable sensors for marine surveying. In all these applications, the towed bodies or streamers may benefit from the use of the rigid-stem streamer assembly instead of the towed-umbilical-on-winch concept that has been used previously.

Figure 3:
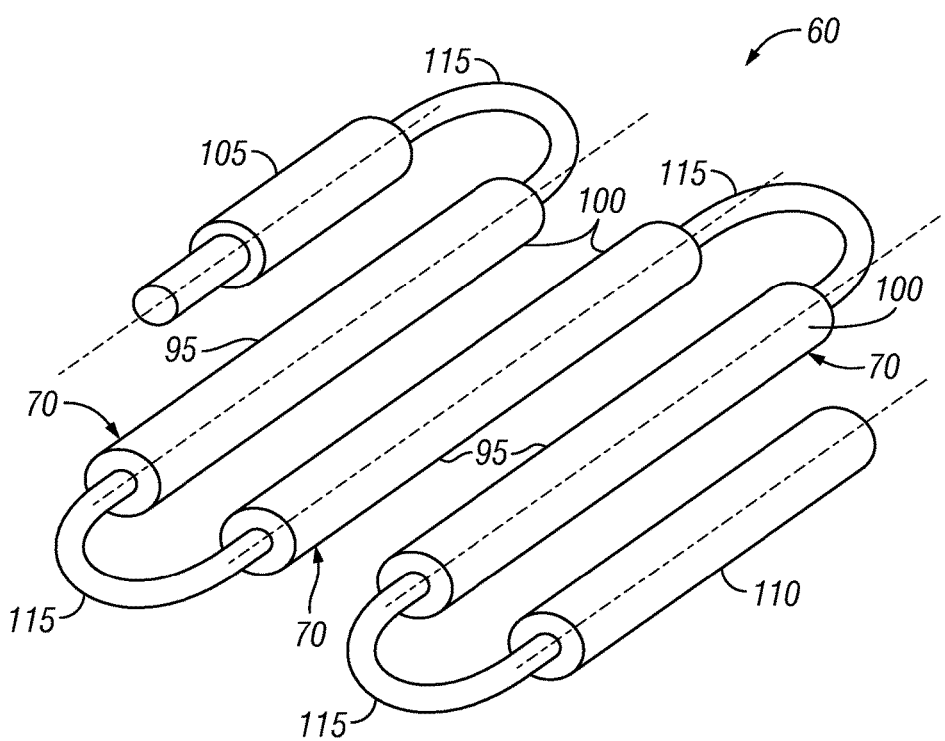
FIG. 3 illustrates a rigid-stem assembly having the flexible connection between rigid stems in an open position in accordance with example embodiments of the present invention.

Referring now to FIG. 3, a rigid-stem streamer assembly 60 is illustrated in more detail in accordance with embodiments of the present invention. The rigid-stem streamer assembly 60 shown on FIG. 3 may be used to form at least part of a streamer 45 towed from a survey vessel 10 that are conventionally in the form of flexible cables. The rigid-stem streamer assembly 60 may be a structure for a number of items, including feed lines, gas lines, optical and/or electrical signals, power, external devices, geophysical sensors, tension sensors, and geophysical sources. The rigid-stem streamer assembly 60 is shown in an open configuration in which the flexible connection between adjacent stems 65 is open. When open the rigid-stem streamer assembly 60 may fold from at least 10° to at least 180° in one plane between adjacent rigid stems 70. In some embodiments, the rigid-stem streamer assembly 60 may be stored on the survey vessel 10 in the open configuration and assembled prior to deployment into the body of water 15.

As illustrated, the rigid-stem streamer assembly 60 may comprise a plurality of rigid stems 70. The rigid-stem streamer assembly 60 (when assembled) is characterized as being rigid in that it has as bending, torsion, and/or inline stiffness than can be maintained for considerable lengths, for example, up to about 10 meters, about 50 meters, about 100 meters, or even longer. Unlike cables and structures that have been used previously as streamers, the rigid-stem streamer assembly 60 should not exhibit catenary behavior over at least portions of the length, but should rather exhibit elastic behavior with deformation according to deformation of beams and not sinus hyperbolic or parabolic as for cables and the like. Accordingly, the rigid-stem streamer assembly 60 when assembled cannot be stored and deployed from a drum, but rather may utilize a movable or fixed attachment point (such as a detensioning apparatus comprising wheel pairs) for deployment from the survey vessel 10 (e.g., shown on FIG. 1). The attachment point can hold the rigid-stem streamer assembly 60 by friction (e.g., wheel pairs) or a ring, for example. In some embodiments, the rigid-stem streamer assembly 60 may be characterized as being rigid for a length of about 25 meters or longer wherein the rigid stems 70 have a smallest width or height of about 1 meter or less.

In some embodiments, the rigid-stem streamer assembly 60 may have a bending stiffness of 700 Newton-square meters ($Nm^2$") or greater over considerable lengths (e.g., about 25 meters or more). For example, the rigid-stem streamer assembly 60 may have a bending stiffness of 700 $Nm^2$ over substantially its entire length. Each of the rigid stems 70 may also have a bending stiffness of 700 $Nm^2$. The stiffness of 700 $Nm^2$ corresponds to a stiffness in a cantilever beam of 1-meter length fixed in one end with a load of 1 Newton in the other, deforming roughly 0.5 mm under the load. This corresponds to an aluminum (with Young's modulus of 70 GPa) tube with a 2-inch outer diameter and a thickness of 0.2 millimeters, a steel (with Young's modulus of 210 GPa) tube with a 2-inch outer diameter with a thickness of 0.03 millimeters or a circular rod with a Young's modulus of 2 GPa. Each of these items, i.e., the aluminum tube, the steel tube, and the circular rod, are examples of items with a bending stiffness of 700 $Nm^2$. A 2-inch outer diameter typically requires 5% deformation to be wound on a 2-meter drum, which is difficult for most materials. Most rigid materials can deform a maximum of 0.1% or, in extreme cases, 1% so they cannot be wound on a drum without being wound in a wire or umbilical. Lower strength materials may be able to deform but will then be soft to enable bending.

Embodiments of the present technique are for use with materials having a stiffness that make them difficult to take the rigid-stem streamer assembly 60 on or off a drum. The rigidity will create a bending arm for the tension under which it is taken in or out. This distance multiplied with the tension, creates the load which the rigid-stem streamer assembly 60 has to carry in the cross section of the first point of contact with the drum and is a critical load. The point of contact can be at or before the tangential point between the drum and the rigid-stem streamer assembly 60 wherein the tangential point corresponds to no stiffness in the rigid-stem streamer assembly 60 and bending arm of zero. Instruments used previously in marine surveying typically have several contributors to the bending arm. For example, sensors streamers may have repeaters, connectors, sensor housings and the like that can add to the bending arm. In addition, bend restrictors may also be placed in the ends to protect the wires inside which can add to the bending arm. Lead-Ins may also have several different contributors to increased bending arm, including reinforced umbilicals, solids such as gel filled, soft rigidified or the like, and true solids such as nylons, polyurethane, or compositions. For previous instruments used in marine surveying, the bending arm has been less than 0.3 m under a load of 3 kiloNewtons ("IN"). Some types will have almost the same bending arm for different loads (typically hinged joints and rigid bodies), other will deform much under increasing load and hence reduce bending arm (while load goes up), but all materials are limited in stiffness and have a certain deformation, even though the deformation can be very difficult to detect. Embodiments of the present technique may be used with a rigid-stem streamer assembly 60 more rigid than 700 $Nm^2$. This is more rigid than other cable or streamer-based instruments that have been used hereto for and, thus, the bending arm can become larger than 0.3 m. The rigid-stem streamer assembly 60 is then in danger of damage or permanent deformation if subjected to 3 kN or more, hence winching is not a good handling method.

The rigid stems 70 may each comprise a stem body 95. A variety of different materials and composites may be suitable for use in the stem body 95. In some embodiments, the stem body 95 may be made from a material comprising aluminum, stainless steel, or titanium. In some embodiments, the stem body 95 may be made from a material comprising a composite, such as glass- or carbon-reinforced plastics, such as glass or carbon fibers in combination with epoxy or other resins (e.g., polyester, vinyl ester, nylon, etc.). In some embodiments, the glass fibers may include e-glass fibers. In some embodiments, the stem body 95 may be made from a material comprising a plastic, such as polyethylene, polybutylene terephthalate, polysulphone, or another suitable thermoplastic polymer. Combinations of suitable materials may also be used. One of ordinary skill in the art, with the benefit of this disclosure, should be able to select an appropriate material for the stem body 95 based on a number of factors, including selection of an appropriate stiffness-to-weight while maintaining cost and bonding ability to available resins.

Figure 5:
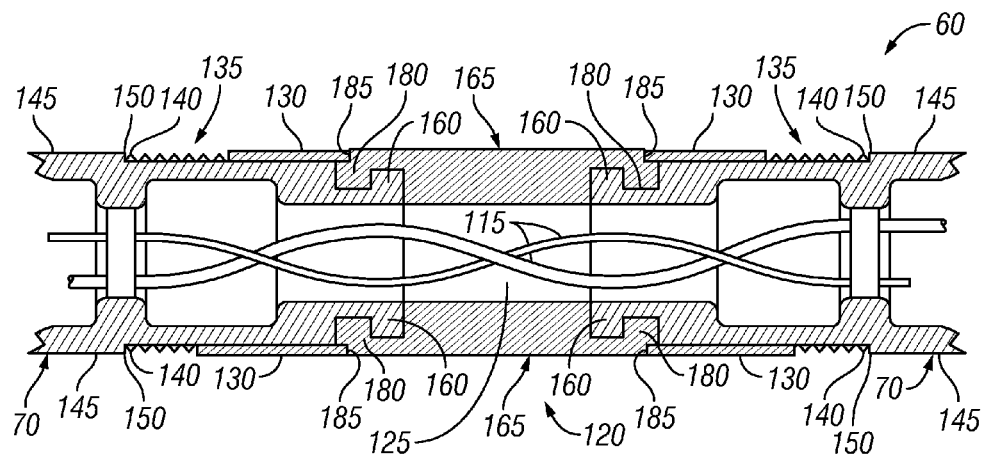

In some embodiments, the stem body 95 may be in the form of a pipe or other conduit that has a tubular portion that defines an interior chamber (e.g., interior chamber 125 shown on FIG. 5). In some embodiments, a buoyant filler material may be used to fill the interior chamber. One example of a suitable buoyant filler material comprises air or other suitable gas. However, other buoyant filler materials may also be used to can provide some degree of positive buoyancy for ballasting as well as electrical insulation, including foams, gelled hydrocarbon-based oil, hydrocarbon-based oil, visco-elastic polymer or other suitable electrically insulating, acoustically transparent materials, for example. In some embodiments, surface treatments may be applied to the exterior surface 100 of the stem body 95, for example, to reduce drag and antifouling. For example, one or more antifouling agents may be applied to the exterior surface 100. By way of further example, one or more drag-reduction treatments may be applied the exterior surface 100. While FIG. 3 illustrates the rigid-stem streamer assembly 60 having three rigid stems 70, it should be understood that embodiments of the rigid-stem streamer assemblies 60 may include more or less than three rigid stems 70, as desired for a particular application.

The rigid stems 70 may each have a length, for example, in a range of from about 1.5 meters to about 50 meters or, alternatively, from about 3 meters to about 12.5 meters. In specific embodiments, the rigid stems 70 may each have a length of about 3.125 meters, about 6.125 meters, or about 12.5 meters. The rigid stems 70 may each have an outer diameter (e.g., D1 on FIG. 18a) in a range of from about 0.02 meters to about 0.2 meters or, in alternative embodiments, of about 0.04 meters to about 0.08 meters, for embodiments with a circular-shaped cross-section, for example. The rigid stems 70 may each have a width ($W_1$ on FIG. 18C) in a range of from about 0.1 meters to about 0.5 meters and a height ($H_1$ on FIG. 18C) up to about 0.4 meters, for embodiments with a wing-shaped cross-section, for example. In some embodiments, the rigid stems 70 may an aspect ratio (ratio of width to height) of about 1 to about 20, about 2 to about 20, or about 1 to about 8. When assembled, the rigid-stem streamer assembly 60 may have a length, for example, in a range of from about 50 meters to about 1000 meters. If more than one rigid-stem streamer assembly 60 is joined end-to-end, the combined assembly may have a length in a range of from about 200 meters to about 2000 meters or longer, for example. In some embodiments, the combined assembly may have a length of up to about 8000 meters, which may be used, for example, with towing depths of a few to several hundred meters.

In some embodiments, the rigid-stem streamer assembly 60 may further comprise end connector elements, at either end of rigid-stem streamer assembly 60. In the illustrated embodiment, the rigid-stem streamer assembly 60 comprises as a male-type end connector element 105 at one end and a female-type end connector element 110 at the opposite end. The end connector elements should be configured for connection to corresponding connector elements (not shown) disposed at the longitudinal ends of adjacent rigid-stem lead-in assemblies. Each of the end connector elements can make mechanical and electrical connection to corresponding end connector elements on the other rigid-stem assembly (not shown).

In some embodiments, one or more flexible cables 115, which may be an electrical or optical conductor, for example, extends between the rigid stems 70. The flexible cables 115 may make a flexible connection between the adjacent rigid stems 70. In some embodiments, the flexible cable 115 may conduct a gas, such as air, for maintenance of air volumes, ballasting, and recover, as well as supply to air guns, which may be on the rigid-stem assembly 10060 for example. As illustrated, the flexible cable 115 may extend from either end of the rigid-stem streamer assembly 60 between the connector elements (e.g., from the male-type connector element 105 to the female-type connector element 110). The flexible cable 115 may extend through the interior chamber in the rigid stems 70. In some embodiments, the flexible cable 115 may comprise multiple cables extending through the passageway.

While not shown on FIG. 3, sensors, actuators, transducers, and other electronics (e.g., tanks, batteries, etc.) may also be incorporated into the rigid stems 70. Example sensors that may be incorporated include sound/pressure sensors, motion sensors (speed, velocity, and/or acceleration), EM sensors, magnetism (e.g., compass), pressure/depth sensors, tension sensors, surface or bottom echo-sounders/mappers. Examples of transducers include sound/pressure for acoustic positions, lateral (e.g., to maintain network of positions for several instruments, inline (e.g., bending/water properties), bottom (height) or surface (depth), and electro-magnetic. In some embodiments, one or more actuators may be incorporated into the rigid stems 70. Example actuators may include control surfaces, ballast tanks, openings, covers/lids, and connection points, among others. For example, control surfaces (such as wings) for steering or rotational position may be used. The control surfaces may act to provide depth and/or lateral control for the rigid stems 70. Moreover, the control surfaces may allow the rigid stems 70 to perform a desired move while in the water, such as an undulation, surfacing, diving, rescue, or recovery. Ballast tanks may be also be incorporated that can allow the rigid stems to maintain depth, surface, or compensate for water intrusion, such as by gassing a flooded chamber in the rigid stem 70. Openings may also be provided for access to sensor surfaces, ballast, and/or weight/mass center manipulation. Connection points that are openable and/or closable may also be provided in the rigid stems 70, such as valves or ports for feed or transmission lines. Covers/lids that are openable and/or closable may also be provided, which may enable cleaning and/or streamlined handling, for example.

As previously mentioned, FIG. 3 shows the rigid-stem streamer assembly 60 in an open configuration, for example, in which the streamer assembly 60 may be stored on the survey vessel 10. The configuration is referred to as being "open" because the flexible connection between adjacent rigid stems 70 is open. To rigidify the rigid-stem streamer assembly 60, the flexible connection between the rigid stems 70 may be closed. In some embodiments, closing the flexible connection may result in a bending stiffness at the connection that is proximate (e.g., within approx. 10%) the bending stiffness of the rigid stems 70 themselves. If the closing results in a bending stiffness at the interconnection of the rigid stems 70 that is proximate the bending stiffness of the rigid stems 70 themselves, then a resulting body with close to uniform bending stiffness should result. If the closing still results in one or more of the connections between rigid stems having a softer bending stiffness, this connection(s) will likely dominate the deformation, but could still have considerably higher bending stiffness than without the closing. It should be understood that the term "close," "closing," or "closed" when referencing the flexible connection is not referring to sealing of the flexible connection to prevent ingress of fluids, such seawater, but rather refers to rigidifying the flexible connection to increase the bending stiffness of the rigid-steam streamer assembly 60 at the interconnection of the rigid stems 70. A number of different techniques may be used for closing the flexible connection between the rigid stems, including without limitation a stem joint clamped between the adjacent rigid stems, a locking nut with inline pin, socket connections, face, and mating plane orthogonal to main axis. In some embodiments, stem joints may be secured between pairs of the rigid stems that are adjacent to one another to close the flexible connections and make the rigid-stem streamer assembly 60 more rigid. In alternative embodiment, locking pins may be secured between pairs of the rigid stems that are adjacent to another to close the flexible connections and make the rigid-stem streamer assembly 60 more rigid. In alternative embodiments, rod-and-socket connections may be made between pairs of the rigid stems that are adjacent to one another to close the flexible connections and make the rigid-stem streamer assembly 60 more rigid. In yet further alternative embodiments, a protective cover may be placed over the flexible connections between pairs of the rigid stems that are adjacent to one another to close the flexible connections and make the rigid-stem streamer assembly 60 more rigid.

Figure 4:
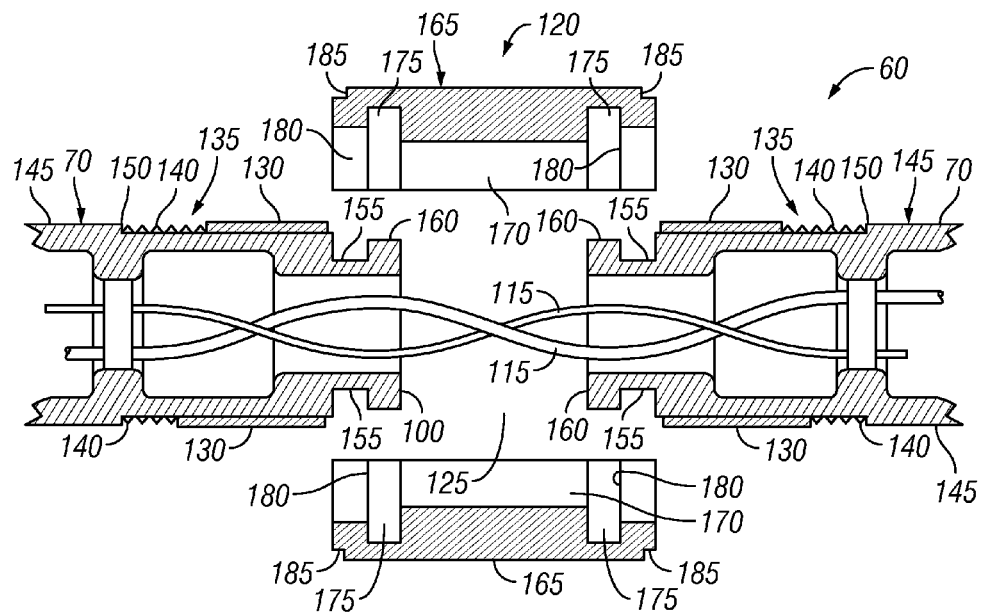
FIGS. 4 and 5 illustrate use of a stem joint to close the flexible connection between adjacent rigid stems in accordance with example embodiments of the present invention.

FIGS. 4 and 5 illustrates a section of a rigid-stem streamer assembly 60 that uses of a stem joint 120 clamped between the adjacent rigid stems 70 to close the flexible connection by forming a rigid connection between the adjacent rigid stems 70 in accordance with example embodiments of the present invention. As illustrated, the rigid stems 70 are adjacent to one another and may each have an interior chamber 125 with flexible cables 115 extending between the rigid stems 70. The flexible cables 115 may run between the rigid stems 70 by way of the interior chamber 125 forming a flexible connection between the rigid stems 70. In accordance with present embodiments, sleeves 130 may be used for holding the stem joint 120 in clamping position to close the flexible connection between the rigid stems 70. The ends portions 135 of each of the rigid stems 70 may comprise one of the sleeves 130. The sleeves 130 may be slidably moveable on the end portions 135. The sleeves 130 may each be spring loaded by a corresponding spring 140. The outer surface 145 of each of the rigid stems 70 may comprise a shoulder 150 for receiving the corresponding spring 140. The end portions 135 of each of the rigid stems 70 may further comprise a notch 155 that defines a shoulder 160, as best seen in FIG. 4.

The stem joint 120 may comprise two clamp portions 165. The clamp portions 165 should cooperate with one another so that, when the stem joint 120 is assembled, the clamp portions 165 define a rigid-stem passage that receives at least a portion of the end portions 135 of the rigid stems 70. In some embodiments, each of the clamp portions 165 may have a C-shaped cross-section. It should be understood that the cross-section of the clamp portions 165 may vary, for example, based on the particular configuration of the rigid stems 70. The clamp portions 165 may each have an interior surface 170, as best seen in FIG. 4. The interior surfaces 170 may each have recesses 175 at either end therein that engage the corresponding shoulders 160 of the end portions 140 when the stem joint 130 is assembled, as best seen in FIG. 5. The recesses 175 may each extend around the interior surface 170 at either end of the corresponding clamp portion 165. A clamping shoulder 180 may be defined by each of the recesses 175. The clamping shoulders 180 may engage the corresponding notches 155 in the end portions 140 when the stem joint 130 is assembled, as best seen in FIG. 5. Each end of the clamp portions 165 may further comprise an exterior shoulder 185 for receiving the corresponding sleeve 135, as best seen in FIG. 5. Each of the sleeves 135 slides into the corresponding exterior shoulders 185 to fasten the clamp portions 165 in clamping position to couple the rigid stems 105, as shown by FIG. 5.

Figure 6:
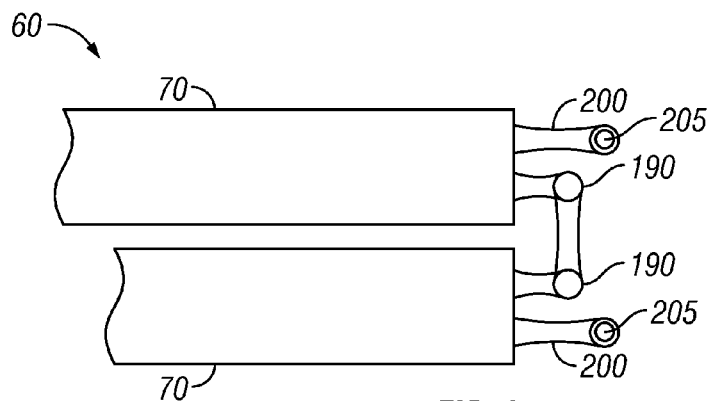
FIGS. 6 and 7 illustrate use of a locking pin to close the flexible connection between adjacent rigid stems in accordance with example embodiments of the present invention.
Figure 7:
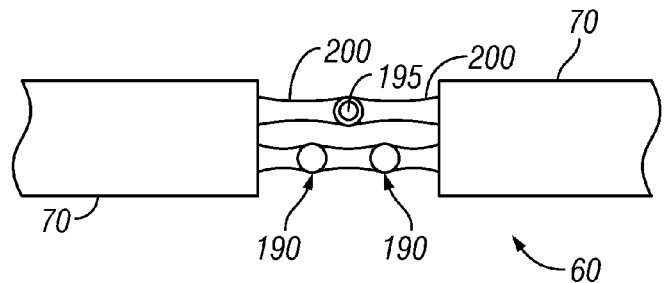

FIGS. 6 and 7 illustrate an alternative embodiment for closing the flexible connection between the adjacent rigid stems 70. In the illustrated embodiment, a section of a rigid-stem streamer assembly 60 is shown that comprises two adjacent rigid stems 70. As illustrated by FIG. 6, the adjacent rigid stems 70 may be held together by two hinges 190 in the open position. The hinges 190 may generally form a flexible connection between the adjacent rigid stems 70. In general, the hinges 190 may allow for folding up to 180 degrees in one plane so that the streamer assembly 60 may be stored on the survey vessel 10 when not in use. Other designs for the hinges 190 may be used in accordance with embodiments of the present invention. While not shown, electrical or optical conductors may also extend between the adjacent rigid stems 70. FIG. 7 illustrates the flexible connection between the rigid stems 70 in a closed position. In the illustrated embodiment, a locking pin 195 may be used to secure the flexible connection between the rigid stems 70, rigidifying the connection there between. As shown, each of the rigid stems 70 may have an arm 200 extending longitudinally there from. Openings 205 at the end of each arm 200 may be aligned with the locking pin 195 disposed through the aligned openings 205 to close the flexible connection. While FIGS. 6 and 7 illustrate use of hinges 190 to form the flexible connection, other suitable techniques such as the flexible cable 115 (e.g., FIG. 3) may be used to form the flexible connection with the locking pin 195 used to close the flexible connection.

Figure 8:
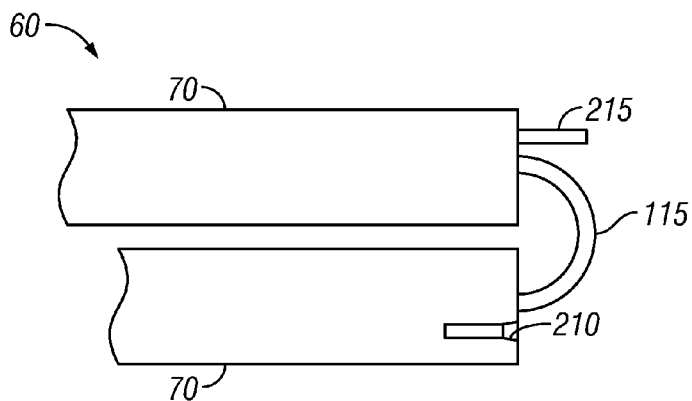
FIGS. 8 and 9 illustrate use of an extendible rod to close the flexible connection between adjacent rigid stems in accordance with example embodiments of the present invention.
Figure 9:
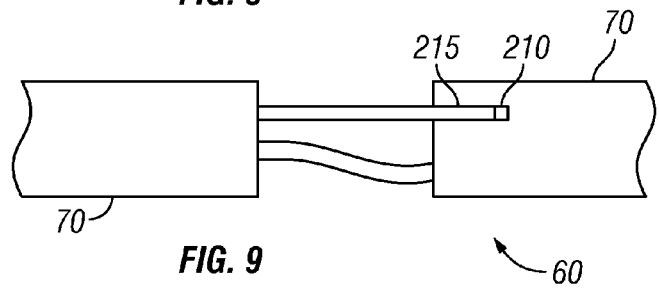

FIGS. 8 and 9 illustrate another alternative embodiment for closing the flexible connection between the adjacent rigid stems 70. In the illustrated embodiment, a section of a rigid-stem streamer assembly 60 is shown that comprises two adjacent rigid stems 70. As illustrated by FIG. 8, the adjacent rigid stems 70 may be held together by a flexible cable 115 in the open position. The flexible cable 115 may generally form a flexible connection between the adjacent rigid stems 70, for example, to allow folding of the streamer assembly 60 for storage when not in use. FIG. 9 illustrates the flexible connection between the rigid stems 70 in a closed position. In the illustrated embodiment, one of the rigid stems 70 includes a socket 210 while the other one of the rigid stems 70 includes an extendable member, such as extendable rod 215. The extendible rod 215 may be configured to extend into the socket 210 to close the flexible connection rigidifying the connection between the adjacent rigid stems 70. The bending stiffness of the extendable rod 215 may be used to rigidify the connection and prevent bending. While FIGS. 8 and 9 illustrate use of the flexible cable 115 to form the flexible connection, other suitable techniques such as the hinges 190 (e.g., FIG. 6) may be used to form the flexible connection with the extendable rod 215 and socket 210 used to close the flexible connection.

Figure 10:
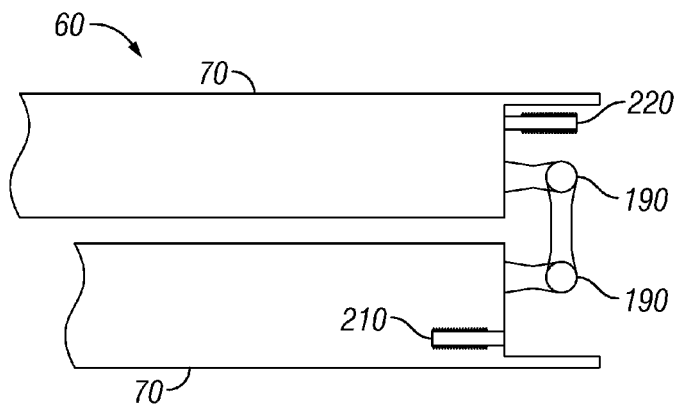
FIGS. 10 and 11 illustrate use of an extendible rod with a stopper hinge to close the flexible connection between adjacent rigid stems in accordance with example embodiments of the present invention.
Figure 11:
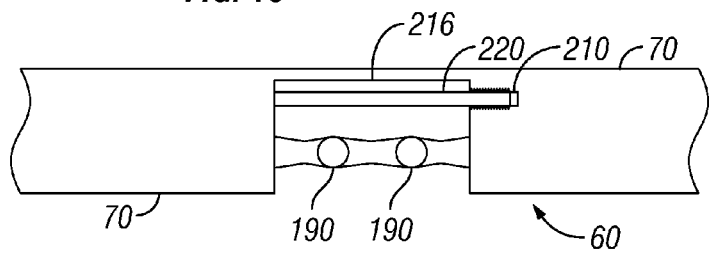

FIGS. 10 and 11 illustrate another alternative embodiment for closing the flexible connection between the adjacent rigid stems 70. In the illustrated embodiment, a section of a rigid-stem streamer assembly 60 is shown that comprises two adjacent rigid stems 70. As illustrated by FIG. 10, the adjacent rigid stems 70 may be held together by hinges 190 in the open position. The hinges 190 may generally form a flexible connection between the adjacent rigid stems 70, for example, to allow folding of the streamer assembly 60 for storage when not in use. FIG. 11 illustrates the flexible connection between the rigid stems 70 in a closed position. In the illustrated embodiment, one of the rigid stems 70 includes a socket 210, which may be threaded, for example. The opposing one of the rigid stems 70 may include an extendable member, such as threaded rod 220. The threaded rod 220 may be rotated into threaded engagement with the socket 210 to close the flexible connection and thus rigid the connection to prevent bending. FIGS. 10 and 11 also show a stopper 216 to further enable a rigid connection, for example, when the threaded rod 215 may be in tension only. While FIGS. 10 and 11 illustrate use of the hinges 190 to form the flexible connection, other suitable techniques such as the flexible cable 115 (e.g., FIG. 3 or FIG. 8) may be used to form the flexible connection with the threaded rod 220 and socket 210 used to close the flexible connection.

Figure 12:
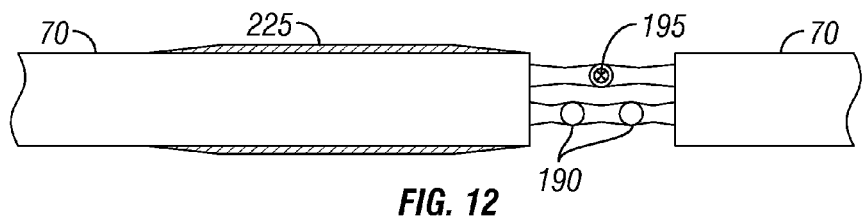
FIGS. 12 and 13 illustrate use of a protective cover over the flexible connection in accordance with example embodiments of the present invention.
Figure 13:
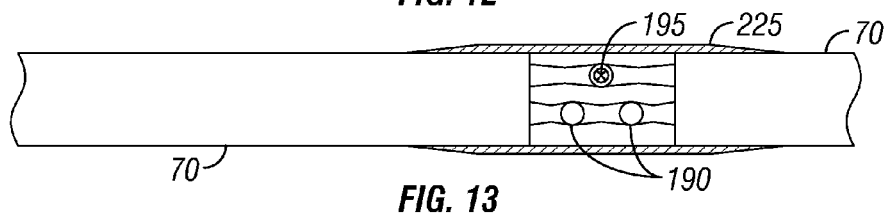

FIGS. 12 and 13 illustrate an example embodiment that includes a protective cover 225. As illustrated, the protective cover 225 may be applied between the adjacent rigid stems 70 to protect the flexible connection, such as electrical conductors, optical conductors, and other cables, parts, and supply lines that may line therein. The protective cover 225 may extend over the flexible connection in the closed position, best seen in FIG. 13. In some embodiments, the protective cover 225 may be positioned on one of the rigid stems 70 (FIG. 12) and slid over the flexible connection for protection (FIG. 13). The protective cover 225 may lock with engaging threads (not shown) directly on the rigid stems 70, fit on one or more cylindrical surfaces (not shown) on each side of the rigid stems 70, or mate in other ways that will be apparent to those of ordinary skill in the art, with the benefit of this disclosure. The protective cover 225 may be placed over the flexible connection manually or with a machine. In other embodiments, the protective cover may be held together with lock pins, nuts, or another suitable connection mechanism. While FIGS. 12 and 13 illustrate use of the hinges 190 to form the flexible connection and locking pin 195 to close the flexible connection, other suitable techniques such as those described herein may be used in accordance with embodiments of the present invention.

Figure 14:
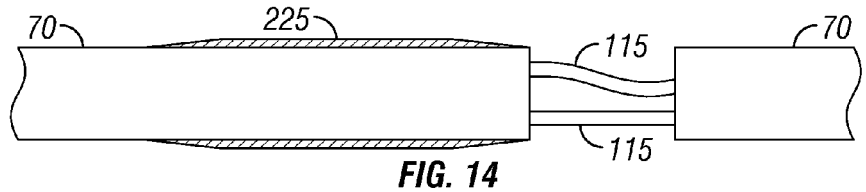
FIGS. 14 and 15 illustrate use of a protective cover to close the flexible connection in accordance with example embodiments of the present invention.
Figure 15:
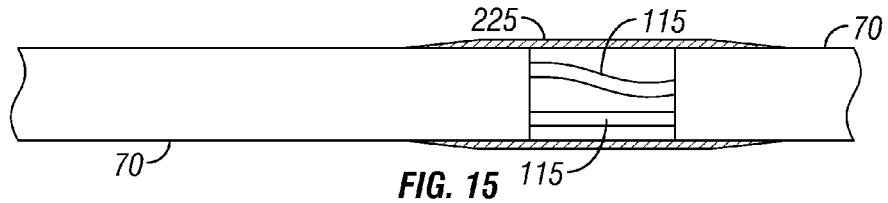

As illustrated by FIGS. 14 and 15, the protective cover 225 may also be used in some embodiments to close the flexible connection, thus rigidifying the connection to prevent bending. A flexible cable 115 may be used to hold the adjacent rigid stems 70 together in the open position, as best seen in FIG. 14. To close the flexible connection, the protective cover 225 may be applied between the adjacent rigid stems 70. While FIGS. 14 and 15 illustrate use of the flexible cable 115 to form the flexible connection, other suitable techniques such as the hinges 190 (e.g., FIG. 6, 10, or 12) may be used to form the flexible connection with the protective cover 225 used to close the flexible connection.

Figure 16:
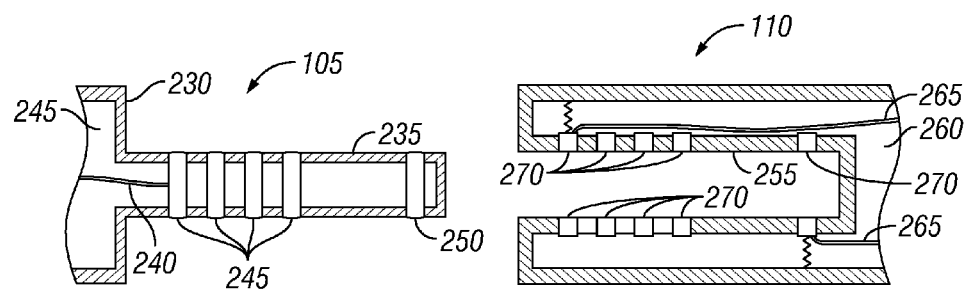
FIGS. 16 and 17 illustrate coupling of two rigid-stem assemblies in accordance with embodiments of the present invention.
Figure 17:
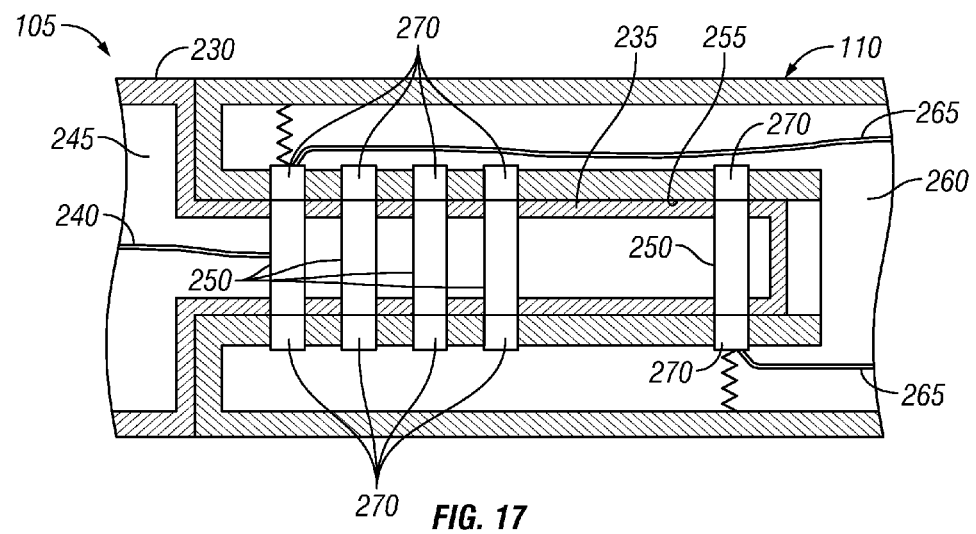

As previously mentioned, embodiments may comprise two or more two or more rigid-stem streamer assemblies 60 coupled end-to-end to form a streamer 45. While a number of different techniques may be used for coupling the streamer assemblies 60 to one another, end connector elements may be disused at either end of the streamer assemblies for coupling. FIGS. 16 and 17 illustrate end connector elements that may be used in accordance with embodiments of the present invention for coupling rigid-stem streamer assemblies 60. As illustrated, a male-type connector element 105 may be used that include a base portion 230 and an extension 235 from the base portion 230. The male-type connector element 105 may further include conductors 240, such as electrical and optical conductors, in an interior portion 245 of the connector element 105. The extension 235 may include electrical contacts 250. A female-type connector element 110 may also be used that includes a socket 255. An interior portion 260 of the connector element 110 may also include conductors 265, such as electrical and optical conductors. The socket 255 may also include electrical contacts 270, for example. As best seen in FIG. 17, extension 235 of the male-type connector element 105 may be engaged in the socket 255 of the female-type connector element 110. Electrical and/or optical connection may be made between the connector elements 105, 110, for example, by using the electrical contacts 250, 270 in the extension 235 and the socket 255, respectively.

Figure 18C:
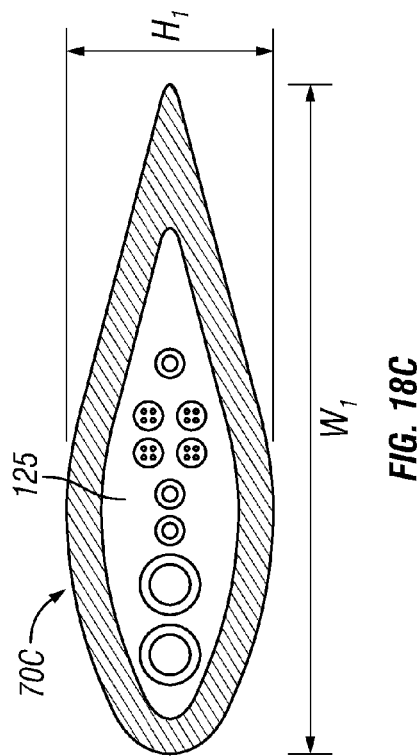
FIGS. 18A through 18C illustrate rigid-stems having different cross-sections in accordance with embodiments of the present invention.
Figure 18B:
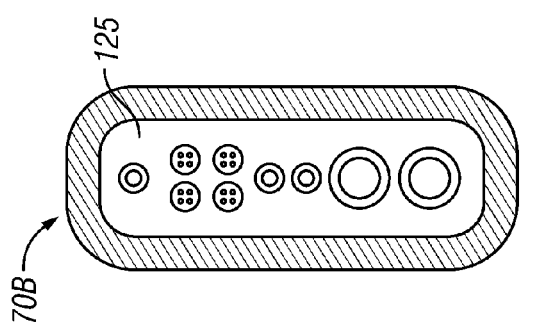
Figure 18A:
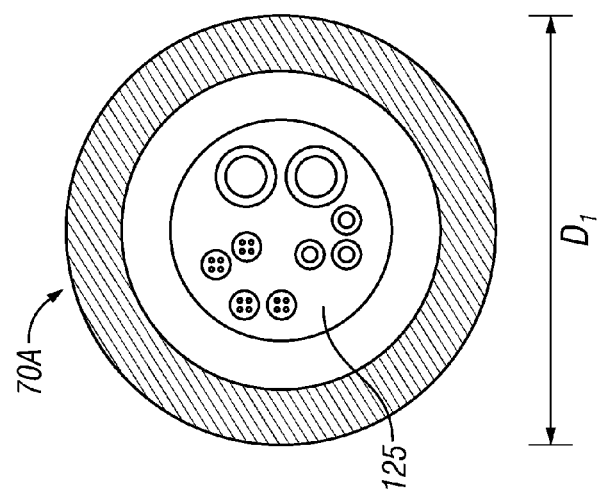

It should be understood that the shape of the cross-section of the rigid stems 70 need not be circular, but may vary as desired for a particular application. The rigid stems 70 may have, for example, an oval-, circular-, triangular-, square-, pentagonal-, other polygonal-, wing-, or non-symmetrical-shaped cross-section. FIGS. 18A through 18C illustrate rigid stems 70 having differently shaped cross-sections. FIG. 18A illustrates a rigid stem 70A having a circular-shaped cross-section. FIG. 18B illustrates a rigid stem 70B having a rectangular-shaped cross-section. FIG. 18C illustrates a rigid stem 165C having a flat or wing-shaped cross-section. The wing-shaped cross-section may be desirable, for example, to reduce the drag coefficient for the rigid-stem streamer assembly 60. In some embodiments (not illustrated), the wing-shaped cross-section may have an asymmetric wing profile, which may be beneficial, for example, to provide one-side lift. The wing-shaped cross section may have ratio of width W1 to height H1 of greater than about and, alternatively, greater than about 1.5. In some embodiments, the wing-shaped cross section may have a ratio of width W1 to height H1 in a range of from about 1 to about 10. FIGS. 18A through 18C further illustrate the rigid stems 70 having an interior chamber 125, which may include various cables, such as electrical or optical cables, for example.

Figure 19:
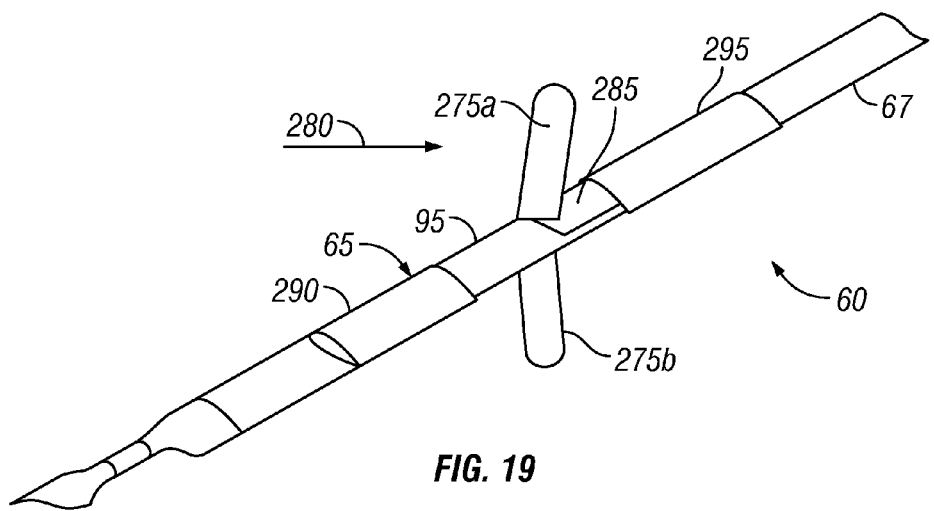
FIG. 19 illustrates a rigid-stem assembly having wings in accordance with embodiments of the present invention.

FIG. 19 illustrates a section of a rigid-stem streamer assembly 60 in which the rigid stem 70 comprises wings 275a, 275b that extend from the stem body 95, in accordance with embodiments of the present invention. As illustrated, the rigid-steam streamer assembly 60 may be towed in or close to the horizontal plane, for example. The flow direction is illustrated on FIG. 19 by arrow 280. To provide lateral force and place the respective sensor streamer 45 (e.g., streamers 45a-45f on FIG. 2) in a selected lateral position, the rigid stem 70 may comprise wings 275a, 275b mounted to the stem body 95. As illustrated, one of the wings 275a, 275b may extend upward from the stem body 95 while the other one of the wings 275a, 275b may extend downward from the stem body 95. In some embodiments, the wings 275a, 275b may be foldable or retractable. By being able to unfold the wings 275a, 275b into an open position, the rigid-stem streamer assembly 60 may be lift-activated after deployment. In other words, the wings 1275a, 275b may be unfolded after deployment into the body of water 15 to move into the selected lateral position. In some embodiments, the stem body 95 may have a rigid-stem cavity 285 for receiving the wings 275a, 275b. In a closed configuration, the wings 275a, 275b may be folded and stored in the rigid-stem cavity 285. To deploy the wings 275a, 275b any of a variety of different suitable techniques may be used. In some embodiments, a wing-covering stem sleeve 290 may cover the wings 270a, 270b retaining them in the rigid-stem cavity 285. In alternative embodiments, the wings 275a, 275b may be opened using hinges or joints (not shown), which may be automated or driven manually, in combination with springs (not shown) for biasing the wings 275a, 275b.

The wing-covering stem sleeve 290 may be disposed over at least a portion of the stem body 95 and be slidably moveable on the stem body 95. For example, the wing-covering stem sleeve 290 may be configured to move on the stem body 95 and uncover the wings 275a, 275b. A thread screw or other suitable mechanism (not shown) may be used to drive the wing-covering stem sleeve 290. In some embodiments, the wings 275a, 275b may be biased, for example, by a spring (not shown) so that uncovering the wings 275a, 275b should cause the wings 275a, 275b to open. To close the wings 275a, 275b, the wing-covering stem sleeve 290 may be slid back over the wings 275a, 275bb to cause the wings to fold back into the rigid-stem cavity 285. The rigid stem 70 may further comprise a wing-cavity stem sleeve 295 disposed over at least a portion of the stem body 95 and slidably moveable on the stem body 95. The wing-cavity stem sleeve 285 may be moved to cover the wing cavity 285, for example, to prevent drag caused by having an opening in the rigid stem 70. The wing-covering stem sleeve 290 and the wing-cavity stem sleeve 295 may have the same shape as the stem body 95, for example, to reduce drag on the rigid-stem streamer assembly 60.

In alternative embodiments (not shown), the wings 275a, 275b may be mounted on the stem body 95 at deployment from the survey vessel 10 and removed from the stem body 95 at retrieval from the body of water 15. For example, the wings 275a, 275b may be mounted on the stem body 95 by way of a snap-on connection (not shown) or other suitable connection mechanism.

While FIG. 19 illustrates only a single rigid stem 70 it should be understood that two or more rigid stems 70 each having wings 275a, 275b may be employed in a rigid-stem streamer assembly 60 in accordance with embodiments of the present invention. To vary the lateral lift generated by the wings 275a, 275b, the wings 275a, 275b on a subset of the rigid stems 70 may be opened. In some embodiments, the rigid-stem streamer assembly 60 may be become engaged with an undesired object, such as fishing gear, debris, or ropes that are in the body of water 15. To disengage the object, the wings 275a, 275b on successive rigid stems 70 may be closed until the object has become disengaged. Depending on the proximity to the sensor streamer 45 and the desired lateral position, different angles β may be selected for the wings 275a, 275b on each of the rigid stems 70.

Accordingly, embodiments may include using a rigid-stem streamer assembly comprising a plurality of interconnected rigid stems in a marine survey. One of the many potential advantages is that the rigid-stem assembly can be made stiffer and lighter than the previously used cables. Embodiments of the lighter rigid-stem assembly may allow use of heavier and more efficient stress members which can be used in combination with air rather than oil or gels for the buoyancy material. Yet another one of the many potential advantages is that the stiffness of the rigid-stem assembly should provide less elongation, creep and shape or position change. Furthermore, due to the increased stiffness, better signal reception may be received from the streamer because of better signal reception by noise filtering, less elongation, creep and more stable shape and position of the sensors. Additionally, reduced drag (e.g., from drag-reducing surface treatment, smoother outside) and having antifouling surfaces (e.g., from application of antifouling agents), may also provide better signal reception. Yet another one of the many potential advantages is that rigid-stem assembly should be less susceptible to rotation and tangling.

Figure 20:
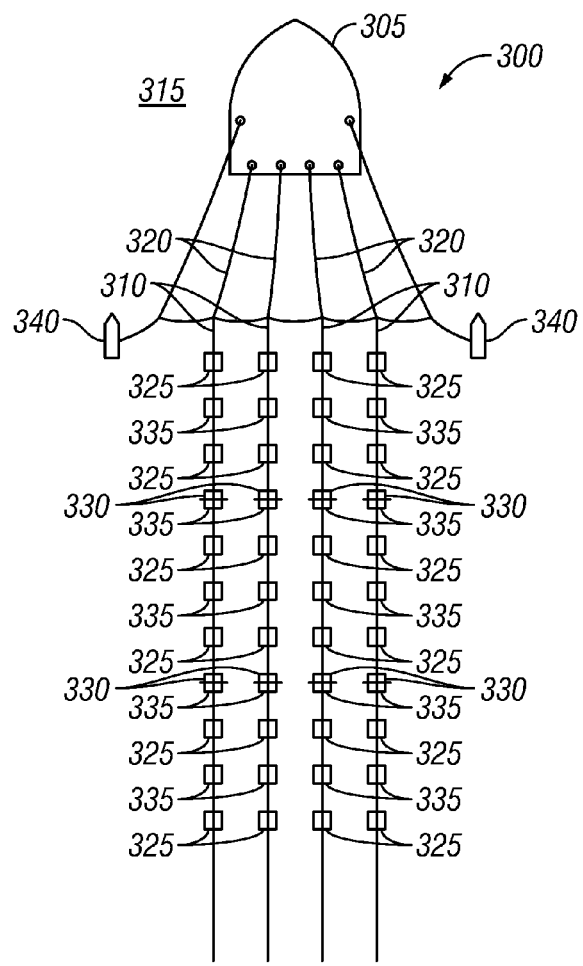
FIG. 20 illustrates a conventional seismic survey system.

In contrast to systems that use rigid-stem streamer assemblies comprising a plurality of interconnected rigid stems in a marine survey, FIG. 20 illustrates a conventional seismic survey system 300. As illustrated, the seismic survey system 300 may include a survey vessel 305 towing a plurality of sensor streamers 310 through a body of water 315. Lead-in lines 320 may be used to couple the sensor streamers 310 to the survey vessel 305. Each of the sensor streamers 310 may include sensors 325. The sensor streamers 305 may also include lateral force and depth ("LFD") control devices 330 (e.g., "birds") and associated acoustic range sensing devices 335, which can be disposed at selected positions along the sensor streamers 305 collocated with the LDF devices 330 or at separate positions. Spreading devices 340, such as doors or paravanes, may be used to maintain lateral separation of the sensor streamers 305. Unlike the system illustrated by FIG. 20, embodiments of the present invention that use rigid-streamer assemblies in a survey may contain almost no buoys, doors, paravanes, chains or extra ropes, or LFD devices, such as birds. For example, a geophysical survey may be performed that only has the desired lights and antennas above the water.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A sensor streamer comprising:
   a plurality of rigid stems that are interconnected end-to-end, wherein the rigid stems each comprise a stem body defining one or more interior chambers, wherein a geophysical sensor is incorporated into one or more of the rigid stems, wherein the sensor streamer has an open configuration and a closed configuration, wherein the open configuration comprises the plurality of the rigid stems interconnected end-to-end by corresponding flexible connections, wherein the closed configuration comprises a plurality of rigid connections that close the flexible connections between adjacent rigid stems such that the plurality of rigid stems forms a rigid stem assembly.

2. The sensor streamer of claim 1, wherein the rigid stems each have a length in a range of from about 1.5 meters to about 50 meters, and wherein the rigid-stem assembly has a length in a range of from about 50 meters to about 1000 meters.

3. The sensor streamer of claim 1, wherein the rigid-stem assembly is characterized as having a bending stiffness of 700 $Nm^2$ over a length of at least about 25 meters.

4. The sensor streamer of claim 1, wherein air or other gas fills the interior chambers in the stem body.

5. The sensor streamer of claim 1, wherein the plurality of rigid connectors comprises stem joints that are secured between the particular rigid stems that are adjacent to one another to make the rigid-stem assembly more rigid.

6. The sensor streamer of claim 1, wherein the plurality of rigid connectors comprise locking pins that are secured between the particular rigid stems that are adjacent to one another to make the rigid-stem assembly more rigid.

7. The sensor streamer of claim 1, wherein the plurality of rigid connectors comprise rod-and-socket connections that are formed between the particular rigid stems that are adjacent to one another to make the rigid-stem assembly more rigid, wherein a rod from one of the rigid stems is extended into a socket in an adjacent one of the rigid stems.

8. The sensor streamer of claim 1, wherein protective covers are disposed over the flexible connections between the particular rigid stems that are adjacent to one another.

9. The sensor streamer of claim 1, wherein hinges interconnect the particular rigid stems that are adjacent to one another in the open configuration to form the flexible connections, the rigid-stem assembly having the closed configuration in which the flexible connection between the particular rigid stems that are adjacent to one another is made more rigid.

10. The sensor streamer of claim 1, wherein one or more flexible cables interconnect the particular rigid stems that are adjacent to one another in the open configuration to form the flexible connections, the rigid-stem assembly having the closed configuration in which the flexible connection between the particular rigid stems that are adjacent to one another is made more rigid.

11. The sensor streamer of claim 1, wherein at least one of the rigid stems comprises a wing mounted to the stem body.

12. The sensor streamer of claim 1, wherein the geophysical sensor comprises at least one of a seismic sensor or an electromagnetic field sensor.

13. A sensor streamer comprising:
a plurality of rigid stems that are interconnected, wherein the rigid stems each comprise a stem body defining one or more interior chambers, wherein a geophysical sensor is incorporated into one or more of the rigid stems, wherein the sensor streamer has an open configuration and a closed configuration, wherein the open configuration comprises the plurality of the rigid stems interconnected end-to-end by corresponding flexible connections, wherein the closed configuration comprises a plurality of rigid connections that close the flexible connections between adjacent rigid stems such that the plurality of rigid stems forms a rigid stem assembly,
wherein the rigid-stem assembly is rigid for a length of at least about 25 meters, the rigid-stem assembly having a smallest width or height of about 1 meter or less.

14. A geophysical survey system comprising:
a survey vessel; and
a sensor streamer comprising a first rigid-stem assembly and a second rigid-stem assembly coupled end-to-end to the first rigid-stem assembly, wherein the first rigid-stem assembly and the second rigid-stem assembly each comprise a plurality of rigid stems, wherein the plurality of rigid stems comprise flexible connections connected end-to-end between adjacent rigid stems and a plurality of rigid connections that close the flexible connections between adjacent rigid stems,
wherein the rigid stems each comprise a stem body defining one or more interior chambers.

15. The system of claim 14, wherein the rigid stems each have a length in a range of from about 1.5 meters to about 50 meters, and wherein the rigid-stem assembly has a length in a range of from about 50 meters to about 1000 meters.

16. The system of claim 14, wherein the rigid connectors comprise stem joints that are secured between the particular rigid stems that are adjacent to one another to make the first rigid-stem assembly and the second rigid-stem assembly more rigid.

17. The system of claim 14, wherein the rigid connectors comprise locking pins that are secured between the particular rigid stems that are adjacent to one another to make the first rigid-stem assembly and the second rigid-stem assembly more rigid.

18. The system of claim 14, wherein the rigid connectors comprise a rod-and-socket connection that is formed between the particular rigid stems that are adjacent to one another to make the first rigid-stem assembly and the second rigid-stem assembly more rigid.

19. The system of claim 14, wherein protective covers are disposed over the flexible connections between the particular rigid stems that are adjacent to one another.

20. A sensor streamer comprising
a rigid-stem assembly comprising a plurality of rigid stems wherein the plurality of rigid stems comprise flexible connections connected end-to-end between adjacent rigid stems and a plurality of rigid connections that close the flexible connections between adjacent rigid stems and wherein each rigid stem comprises a stem body defining one or more interior chambers, wherein the rigid-stem assembly is about 50 meters to about 1000 meters in length, wherein the plurality of rigid stems are about 3 meters to about 12.5 meters in length, wherein the rigid-stem assembly is characterized as having a bending stiffness of 700 $Nm^2$ over a length of at least about 25 meters; and
a geophysical sensor incorporated into one or more of the rigid stems.

21. The sensor streamer of claim 20, wherein air or other gas fills the interior chambers in the stem body.

22. The sensor streamer of claim 20, wherein a rigid-stem assembly is rigid for a length of at least about 25 meters, the rigid-stem assembly having a smallest width or height of about 1 meter or less.

23. The sensor streamer of claim 20, wherein the rigid connections comprise stem joints that are secured between the particular rigid stems that are adjacent to one another to make the rigid-stem assembly more rigid.

24. The sensor streamer of claim 20, wherein the rigid connections comprise locking pins that are secured between the particular rigid stems that are adjacent to one another to make the rigid-stem assembly more rigid.

25. The sensor streamer of claim 20, wherein the rigid connections comprise rod-and-socket connections that are formed between the particular rigid stems that are adjacent to one another to make the rigid-stem assembly more rigid, wherein a rod from one of the rigid stems is extended into a socket in an adjacent one of the rigid stems.

26. The sensor streamer of claim 20, wherein protective covers are disposed over the flexible connections between the particular rigid stems that are adjacent to one another.

27. The sensor streamer of claim 20, wherein hinges interconnect the particular rigid stems that are adjacent to one another in an open configuration to form the flexible connections, the rigid-stem assembly having a closed configuration in which the flexible connection between the particular rigid stems that are adjacent to one another is made more rigid.

28. The sensor streamer of claim 20, wherein one or more flexible cables interconnect the particular rigid stems that are adjacent to one another in an open configuration to form the flexible connections, the rigid-stem assembly having a closed configuration in which the flexible connection between the particular rigid stems that are adjacent to one another is made more rigid.

29. The sensor streamer of claim 20, wherein at least one of the rigid stems comprises a wing mounted to the stem body.

30. The sensor streamer of claim 20, wherein the geophysical sensor comprises at least one of a seismic sensor or an electromagnetic field sensor.

* * * * *